United States Patent
Yi et al.

(10) Patent No.: US 10,885,146 B2
(45) Date of Patent: Jan. 5, 2021

(54) MODAL IDENTIFICATION METHOD FOR NON-PROPORTIONALLY DAMPED STRUCTURES BASED ON EXTENDED SPARSE COMPONENT ANALYSIS

(71) Applicant: Dalian University of Technology, Liaoning (CN)

(72) Inventors: Tinghua Yi, Liaoning (CN); Xiaojun Yao, Liaoning (CN); Chunxu Qu, Liaoning (CN); Hongnan Li, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 16/342,953

(22) PCT Filed: Aug. 27, 2018

(86) PCT No.: PCT/CN2018/102519
§ 371 (c)(1),
(2) Date: Apr. 17, 2019

(87) PCT Pub. No.: WO2020/041935
PCT Pub. Date: Mar. 5, 2020

(65) Prior Publication Data
US 2020/0089730 A1   Mar. 19, 2020

(51) Int. Cl.
G06F 17/15 (2006.01)
G06F 17/13 (2006.01)
G06F 17/16 (2006.01)
G06F 17/14 (2006.01)

(52) U.S. Cl.
CPC ............ *G06F 17/156* (2013.01); *G06F 17/13* (2013.01); *G06F 17/14* (2013.01); *G06F 17/16* (2013.01)

(58) Field of Classification Search
CPC .... G01L 1/00; G01L 7/00; G01N 1/00; G01N 2201/00; G06F 1/00
See application file for complete search history.

(56) References Cited

U.S. PATENT DOCUMENTS

| | | | | |
|---|---|---|---|---|
| 5,490,062 A | * | 2/1996 | Leach | G01V 1/008 702/15 |
| 2010/0195770 A1 | * | 8/2010 | Ricci | A61B 5/0006 375/322 |
| 2013/0298690 A1 | * | 11/2013 | Bond | G01M 7/08 73/788 |
| 2014/0039809 A1 | * | 2/2014 | Girondin | G01N 29/4463 702/39 |
| 2016/0013773 A1 | * | 1/2016 | Dourbal | G06F 17/16 708/209 |
| 2017/0071547 A1 | * | 3/2017 | van Dinther | A61B 5/7253 |

FOREIGN PATENT DOCUMENTS

CN   107943757 A   4/2018

OTHER PUBLICATIONS

Huang et al., "Design for structure health data acquisition based on DSP+ FPGA", Journal of Fuzhou University (Naural Science), Feb. 2010, pp. 75-79, vol. 38, No. 1, China Academic Journal Electronic Publishing House, 5 pages.

* cited by examiner

Primary Examiner — Jermele M Hollington
Assistant Examiner — Temilade S Rhodes-Vivour
(74) Attorney, Agent, or Firm — Muncy, Geissler, Olds & Lowe, PC

(57) ABSTRACT

Data analysis for structural health monitoring relating to a method of modal identification for structures with non-proportional damping based on extended sparse component analysis. Hilbert transform constructs analytical signal of acceleration response. Analytical signal is transformed into time-frequency domain using short-time-Fourier transform. The criterion is taken as the correlation coefficient of adjacent frequency points is close to 1. Points contributed by only one mode are detected from the time-frequency plane. Phases calculated at single-source-points are used to remove local outliers through local outlier factor method. Amplitudes of complex-valued mode shapes are estimated by Hierarchical clustering of amplitudes for time-frequency coefficients at single-source-points. Averaged phases of grouped single-source-points are estimated phases of complex-valued mode shapes. Finally, complex-valued mode shapes are acquired. Modal responses are estimated by sparse reconstruction method. This method extends application range of sparse component analysis method, and can identify complex modes of non-proportionally damped structures.

1 Claim, No Drawings

MODAL IDENTIFICATION METHOD FOR NON-PROPORTIONALLY DAMPED STRUCTURES BASED ON EXTENDED SPARSE COMPONENT ANALYSIS

TECHNICAL FIELD

The present invention belongs to the technical field of data analysis for structural health monitoring, and relates to a modal identification method for non-proportionally damped structures using extended sparse component analysis.

BACKGROUND

Structural modal parameters including the frequencies, mode shapes and damping ratios of the structures represent the main dynamic properties of the structures. The essence of the modal analysis is to decouple the vibration system by using each principle mode of the undamped system. Therefore, the vibration responses under physical coordinates are transformed into modal coordinates. The research object of blind source separation (BSS) technique is the linear mixing system. The aim of BSS is to separate the mixing matrix and source signals from the observed signals. Thus it can be seen that the goal of BSS is in accordance with the aim of modal identification. As a result, BSS technique is suitable for structural modal identification.

In recent years, many BSS methods are applied to modal identification successfully. Regarding the independent component analysis method, modal responses are viewed as signals which are independent to each other. The mode shapes and each modal response are obtained simultaneously by maximizing the non-Gaussianity. Second order blind identification method uses the uncorrelated property to calculate the mode shapes by diagonalizing the correlation matrix of the vibration responses. Sparse component analysis method utilizes the sparsity of the time-frequency domain signal. The mode shapes and modal responses are extracted by clustering technique and sparse reconstruction method. These methods show superiorities in areas of convenience to use and computational efficiency. However, the assumption of structures with proportional damping should be satisfied for these methods.

When the structures are non-proportionally damped, the mode shapes and modal responses of the vibration system are all complex-valued. At this point, the modes generated from the structure are complex modes. Because the practical structure do not satisfy the assumption of proportional damping strictly, considering complex modes of the structure is more practical. At present, researchers have proposed many methods for complex modes problem. For instance, analytical signals are constructed using Hilbert transform. Then complex-valued mode shapes and modal responses are separated through second order blind identification method. Besides, using the displacement and velocity data simultaneously can avoid the error caused by Hilbert transform, which increase the robust of the results. Furthermore, the superposition of the complex modes can be represented as the underdetermined BSS problem. Therefore, the complex modes can be extracted from the displacements through the underdetermined second order blind identification method. However, the aforementioned methods require the number of sensors is more than or equal to the number of modes to be identified. For the field test of large-scale civil structures, the number of sensors installed in the structure may sometimes be less than the number of modes to be identified. Sparse component analysis (SCA) method is proposed regarding the underdetermined BSS problem. This method shows great superiority when the number of sensors is not sufficient. However, SCA is confined to structures with proportional damping. Therefore, it is of great significance to extend SCA method to modal identification of non-proportionally damped structures.

SUMMARY

The object of the present invention is to provide an extended SCA method to expand the use scope of SCA method to modal identification of structures with non-proportionally damped structures.

The technical solution of the present invention is as follows:

The proposed method is an extended SCA based modal identification method for structures with non-proportional damping. Hilbert transform is adopted to construct analytical signals of the vibration signals. The analytical signals are transformed into time-frequency domain through short-time Fourier transform (STFT) method. The single-source-point (SSP) detection technique is used to detect the points which are contributed by only one mode, namely the SSPs. The phases at the SSPs are calculated and the local outliers in the SSPs are removed through the local outlier factor basing on the phase data. Hierarchical clustering method is used to calculate the amplitudes of the complex-valued mode shapes by grouping the amplitudes of the time-frequency points. Meanwhile, the phases of the SSPs belong to each group of the clustering results are averaged to get the phases of the complex-valued mode shapes. Finally, the complex-valued mode shapes are obtained. Modal frequencies and damping ratios of each mode are extracted from the reconstructed modal responses which are recovered using the complex-valued mode shapes and vibration responses.

The detailed procedures are as follows:

Step 1: Constructing the analytical signals of the accelerations

The acceleration of t instant is sampled as $x(t)=[x_1(t), x_2(t), \ldots, x_m(t)]^T$, where m is a number of sensors; $[\bullet]^T$ represents the transpose of a matrix. The acceleration $x(t)$ is transformed to $\hat{x}(t)$ by Hilbert transform, which is represented by $$\hat{x}(t) = \frac{1}{\pi} \int_{-\infty}^{+\infty} \frac{x(\tau)}{t-\tau} d\tau.$$

The analytical signal of the acceleration is constructed by $\tilde{x}(t)=x(t)+j\hat{x}(t)$, where j is the imaginary unit.

Step 2: Obtaining the time-frequency representation of analytical signals

The analytical signal $\tilde{x}(t)$ of the acceleration is transformed into time-frequency domain using STFT. The time-frequency domain signal is represented as $\tilde{x}(t,f)=[\tilde{x}_1(t,f), \tilde{x}_2(t,f), \ldots, \tilde{x}_m(t,f)]^T$ and f is frequency index.

Step 3: Detecting SSPs using average correlation coefficients.

A range of frequencies regarding a certain time period in the time-frequency plane are denoted as an analysis zone F. The correlation coefficient between the time-frequency coefficients of two sensor locations a and b is calculated using $$R_{ab}(t_k, F) = \frac{r_{ab}(t_k, F)}{\sqrt{r_{aa}(t_k, F)r_{aa}(t_k, F)}},$$

where $$r_{ab}(t_k, F) = \sum_{f \in F} |\tilde{x}_a(t_k, f) \cdot \tilde{x}_b(t_k, f)|,$$

$\forall a,b \in \{1, \ldots, m\}$. The correlation coefficients calculated from all sensor locations are averaged to get the average correlation coefficient $$\overline{R}(t_k, F) = \frac{1}{M} \sum_{a=1}^{m} \sum_{b=1, b \neq a}^{m} R_{ab}(t_k, F)$$

where $M = C_m^2$. $C_m^2$ represents the number of combination forms when picking two different unordered samples from m samples. The SSP detection criterion is denoted as $\overline{R}(t_k,F) \geq 1-\varepsilon$, where $\varepsilon$ is a threshold value. If the zone $(t_k,F)$ satisfies the detection criterion, the points in this zone are all marked as SSPs. The detected SSPs are marked as $(\bar{t},\bar{f})$.

Step 4: Removing the local outliers of the SSPs through local outlier factor (LOF) method A first sensor location is chosen as the reference. The phase differences between each sensor location and the first sensor location are calculated by $\theta(\bar{t},\bar{f}) = [\theta_1(\bar{t},\bar{f}), \ldots, \theta_m(\bar{t},\bar{f})]$, where $\theta_k(\bar{t},\bar{f}) = \theta_{\tilde{x}_1(\bar{t},\bar{f})} - \theta_{\tilde{x}_k(\bar{t},\bar{f})}$, $\forall k \in \{1, \ldots, m\}$. Then the local outlier factors for the phase difference vector at $(\bar{t},\bar{f})$ are calculated using LOF method. The SSPs where the local outlier factors exceed 1 are removed. The updated SSPs are denoted as $(\hat{t},\hat{f})$.

Step 5: Clustering the updated SSPs to obtain the amplitudes of the complex-valued mode shapes The amplitudes of the time-frequency coefficients at $(\hat{t},\hat{f})$ are grouped by the Hierarchical clustering method. The clustering centers are the amplitudes of each complex-valued mode shape which are denoted as $|\Phi| = [|\varphi_1|, |\varphi_2|, \ldots, |\varphi_n|]$. $\Phi$ is the modal matrix and $\varphi_i$, $i=1, \ldots, n$ is the mode shape vector; n is the number of modes. Each group of SSPs after clustering are denoted as $(\hat{t}_1,\hat{f}_1), \ldots, (\hat{t}_n,\hat{f}_n)$.

Step 6: Averaging the phases of each grouped SSPs

The phase differences for each grouped SSPs are obtained as $\theta(\hat{t}_1,\hat{f}_1), \ldots, \theta(\hat{t}_n,\hat{f}_n)$. The mean values of phase differences for each grouped SSPs are calculated and denoted as $\overline{\theta}(\hat{t}_1,\hat{f}_1), \ldots, \overline{\theta}(\hat{t}_n,\hat{f}_n)$.

Step 7: Assembling the complex-valued mode shapes using the estimated amplitudes and phases of the mode shapes Each row of the modal matrix is normalized by dividing the first row to obtain the normalized matrix $|\overline{\Phi}| = [|\overline{\varphi}_1|, |\overline{\varphi}_2|, \ldots, |\overline{\varphi}_n|]$. Finally, the complex-valued modal matrix is estimated as $$\Phi = \left[ |\overline{\varphi}_1| e^{j\overline{\theta}(\hat{t}_1, \hat{f}_1)}, |\overline{\varphi}_2| e^{j\overline{\theta}(\hat{t}_2, \hat{f}_2)}, \ldots, |\overline{\varphi}_n| e^{j\overline{\theta}(\hat{t}_n, \hat{f}_n)} \right].$$

Step 8: Identifying the frequency and damping ratio

When the number of sensors m is more than or equal to the number of modes n, the modal responses are calculated by the inverse modal matrix, namely, the modal responses are calculated by $q(t) = \Phi^{-1} \tilde{x}(t)$. $\Phi^{-1}$ is the inverse matrix of $\Phi$. When the number of sensors m is less than the number of modes n, the modal responses are estimated using the cost function $$H_\sigma(q) = L - \sum_{i=1}^{L} \exp\left(\frac{-|q_i|^2}{2\sigma^2}\right)$$

under the constraint condition $\tilde{x} = \Phi q$. The cost function is minimized by the graduated nonconvex optimization method. $q_i$ is the i-th element in q. L is the total number of the elements in q. $\sigma$ is the decrement factor, which is an arithmetic sequence from large to small values. When the modal responses are reconstructed, the frequency of each mode, namely each structural modal frequency, is extracted from the modal response through Fourier transform. The damping ratio of each modal response is extracted by fitting the logarithm function. Then the structural damping ratio of each mode is acquired.

The advantage of this invention is that the modal identification method for non-proportionally damped structures using extended SCA method is proposed. The SCA method is applied to complex modes identification successfully through estimating the amplitudes and phases of the complex-valued mode shapes separately.

DETAILED DESCRIPTION

The present invention is further described below in combination with the technical solution.

The numerical example of a 3 degree-of-freedom mass-spring model is employed. The mass, stiffness, and damping matrix are given as follows:

$$M = \begin{bmatrix} 3 & & \\ & 2 & \\ & & 1 \end{bmatrix},$$

$$K = \begin{bmatrix} 4 & -2 & \\ -2 & 4 & -2 \\ & -2 & 10 \end{bmatrix},$$

$$C = \begin{bmatrix} 0.1856 & 0.2290 & -0.9702 \\ 0.2290 & 0.0308 & -0.0297 \\ -0.9702 & -0.0297 & 0.1241 \end{bmatrix}$$

The initial condition is given as $x(0) = [1, 0, 0]^T$. Then the free vibration responses at the three nodes of the system are acquired. The acceleration responses of the three nodes are sampled with the sampling rate 100 Hz.

Step 1: Constructing the analytical signals of the accelerations

The acceleration of t instant is sampled as $x(t) = [x_1(t), x_2(t), x_3(t)]^T$, where $[\bullet]^T$ represents the transpose of a matrix. The acceleration is transformed to $\hat{x}(t)$ by Hilbert transform, which is represented by $$\hat{x}(t) = \frac{1}{\pi} \int_{-\infty}^{+\infty} \frac{x(\tau)}{t - \tau} d\tau.$$

The analytical signal of the acceleration is constructed by $\tilde{x}(t) = x(t) + j\hat{x}(t)$, where j is the imaginary unit.

Step 2: Obtaining the time-frequency representation of analytical signals

The analytical signal $\tilde{x}(t)$ of the acceleration is transformed into time-frequency domain using STFT. The time-frequency domain signal is represented as x̃(t,f)=[x̃$_1$(t,f), x̃$_2$(t,f), x̃$_3$(t,f)]$^T$ and f is frequency index.

Step 3: Detecting SSPs using average correlation coefficients.

A range of frequencies regarding a certain time period in the time-frequency plane are denoted as an analysis zone F. The correlation between the time-frequency coefficients of two sensor locations a and b is calculated using $$r_{ab}(t_k, F) = \sum_{f \in F} |\tilde{x}_a(t_k, f) \cdot \tilde{x}_b(t_k, f)|,$$

∀a,b∈{1, 2, 3}. The correlation coefficient of $r_{ab}(t_k,F)$ is calculated by $$R_{ab}(t_k, F) = \frac{r_{ab}(t_k, F)}{\sqrt{r_{aa}(t_k, F) r_{aa}(t_k, F)}}.$$

The sensor locations are combined in pairs using any two locations and the correlation coefficients are calculated for the corresponding locations. The correlation coefficients for all the combination forms are averaged to get the average correlation coefficient $\overline{R}(t_k,F)$. The SSP detection criterion is denoted as $\overline{R}(t_k,F) \geq 1-\varepsilon$, where $\varepsilon=10^{-4}$. If the zone $(t_k,F)$ satisfies the detection criterion, the points in this zone are all marked as SSPs. The detected SSPs are marked as $(\bar{t},\bar{f})$.

Step 4: Removing the local outliers of the SSPs through local outlier factor (LOF) method The first sensor location is chosen as the reference. The phase differences between each sensor location and the first sensor location are calculated by $\theta(\bar{t},\bar{f})=[\theta_1(\bar{t},\bar{f}), \ldots, \theta_3(\bar{t},\bar{f})]$, where $\theta_k(\bar{t},\bar{f})=\theta_{\tilde{x}_1(\bar{t},\bar{f})}-\theta_{\tilde{x}_k(\bar{t},\bar{f})}$, ∀k∈{1, ..., 3}. Then the local outlier factors for the phase difference vector at $(\bar{t},\bar{f})$ are calculated using LOF method. The SSPs where the local outlier factors exceed 1 are removed. The updated SSPs are denoted as $(\hat{t},\hat{f})$.

Step 5: Clustering the updated SSPs to obtain the amplitudes of the complex-valued mode shapes The amplitudes of the time-frequency coefficients at $(\hat{t},\hat{f})$ are grouped by the Hierarchical clustering method. The clustering centers are the amplitudes of each complex-valued mode shape which are denoted as $|\Phi|=[|\varphi_1|, |\varphi_2|, |\varphi_3|]$. $\Phi$ is the modal matrix and $\varphi_i, i=1, \ldots, 3$ is the mode shape vector. Each group of SSPs after clustering are denoted as $(\hat{t}_1,\hat{f}_1), \ldots, (\hat{t}_n,\hat{f}_n)$.

Step 6: Averaging the phases of each grouped SSPs

The phase differences for each grouped SSPs are obtained as $\theta(\hat{t}_1,\hat{f}_1), \ldots, \theta(\hat{t}_n,\hat{f}_n)$. The mean values of phase differences for each grouped SSPs are calculated and denoted as $\overline{\theta}(\hat{t}_1,\hat{f}_1), \ldots, \overline{\theta}(\hat{t}_n,\hat{f}_n)$.

Step 7: Assembling the complex-valued mode shapes using the estimated amplitudes and phases of the mode shapes Each row of the modal matrix is normalized by dividing the first row to obtain the normalized matrix $$|\Phi| = [|\varphi_1|, |\varphi_2|, |\varphi_3|] = \begin{bmatrix} 1 & 1 & 1 \\ 0.9904 & 1.4734 & 0.9442 \\ 8.0556 & 0.4437 & 0.2228 \end{bmatrix}.$$

Finally, the complex-valued modal matrix is estimated as $$\Phi = \left[|\varphi_1|e^{j\overline{\theta}(\hat{t}_1,\hat{f}_1)}, |\varphi_2|e^{j\overline{\theta}(\hat{t}_2,\hat{f}_2)}, |\varphi_n|e^{j\overline{\theta}(\hat{t}_3,\hat{f}_3)}\right]$$

$$= \begin{bmatrix} 1.0000 & 1.0000 & 1.0000 \\ -0.1915-0.9717j & -1.4713+0.0789j & 0.9440+0.0197j \\ 0.6035+8.0329j & -0.3872+0.2165j & 0.2014+0.0954j \end{bmatrix}.$$

Step 8: Identifying the frequency and damping ratio

The inverse of complex modal matrix $\Phi$ is calculated. The modal responses are calculated by $q(t)=\Phi^{-1}\tilde{x}(t)$ where $\Phi^{-1}$ is the inverse matrix of $\Phi$. If the accelerations of node 1 and node 2 are adopted, the number of sensors is less than the number of modes. The modal responses are estimated using the cost function $$H_\sigma(q) = L - \sum_{i=1}^{L} \exp\left(\frac{-|q_i|^2}{2\sigma^2}\right)$$

under the constraint condition $\tilde{x}=\Phi q$. The cost function is minimized by the graduated nonconvex optimization method to estimate the modal responses. $q_i$ is the i-th element in q. L is the total number of the elements in q. $\sigma$ is the decrement factor, which is given as $\sigma=[0.5, 0.4, 0.3, 0.2, 0.1]$. The final identified modal frequencies are 0.1360 Hz, 0.2472 Hz, and 0.5001 Hz. Damping ratios of each mode are 3.1898%, 1.6403%, and 1.7333%.

We claim:

1. A modal identification method for non-proportionally damped structures based on extended sparse component analysis, wherein the steps are as follows:

step 1: constructing the analytical signals of the accelerations the acceleration of t instant is sampled as $x(t)=[x_1(t), x_2(t), \ldots, x_m(t)]^T$, where m is a number of sensors; $[\bullet]^T$ represents the transpose of a matrix; the acceleration $x(t)$ is transformed to $\hat{x}(t)$ by Hilbert transform, which is represented by $$\hat{x}(t) = \frac{1}{\pi}\int_{-\infty}^{+\infty} \frac{x(\tau)}{t-\tau} d\tau;$$

an analytical signal of the acceleration is constructed by $\tilde{x}(t)=x(t)+j\hat{x}(t)$, where j is the imaginary unit;

step 2: obtaining the time-frequency representation of analytical signals the analytical signal $\tilde{x}(t)$ of the acceleration is transformed into time-frequency domain using STFT; a time-frequency domain signal is represented as $\tilde{x}(t,f)=[\tilde{x}_1(t,f), \tilde{x}_2(t,f), \ldots, \tilde{x}_m(t,f)]^T$ and f is frequency index;

step 3: detecting SSPs using average correlation coefficients;

a range of frequencies regarding a certain time period $t_k$ in the time-frequency plane are denoted as an analysis zone F; the correlation coefficient between the time-frequency coefficients of two sensor locations a and b is calculated using $$R_{ab}(t_k, F) = \frac{r_{ab}(t_k, F)}{\sqrt{r_{aa}(t_k, F) r_{aa}(t_k, F)}},$$

where $$r_{ab}(t_k, F) = \sum_{f \in F} |\tilde{x}_a(t_k, f) \cdot \tilde{x}_b(t_k, f)|,$$

$\forall a,b \in \{1, \ldots, m\}$; the correlation coefficients calculated from all sensor locations are averaged to get an average correlation coefficient $$\bar{R}(t_k, F) = \frac{1}{M} \sum_{a=1}^{m} \sum_{b=1, b \neq a}^{m} R_{ab}(t_k, F)$$

where $M = C_m^2$; $C_m^2$ represents the number of combination forms when picking two different unordered samples from m samples; the SSP detection criterion is denoted as $\bar{R}(t_k, F) \geq 1 - \varepsilon$, where $\varepsilon$ is a threshold value; if the zone $(t_k, F)$ satisfies the detection criterion, the points in this zone are all marked as SSPs; the detected SSPs are marked as $(\bar{t}, \bar{f})$;

step 4: removing the local outliers of the SSPs through local outlier factor method a first sensor location is chosen as the reference; the phase differences between each sensor location and the first sensor location are calculated by $\theta(\bar{t},\bar{f}) = [\theta_1(\bar{t},\bar{f}), \ldots, \theta_m(\bar{t},\bar{f})]$, where $\theta_k(\bar{t},\bar{f}) = \theta_{\tilde{x}_1(\bar{t},\bar{f})} - \theta_{\tilde{x}_k(\bar{t},\bar{f})}$, $\forall k \in \{1, \ldots, m\}$;

then the local outlier factors for the phase difference vector at $(\bar{t},\bar{f})$ are calculated using local outlier factor method; the SSPs where the local outlier factors exceed 1 are removed; the updated SSPs are denoted as $(\hat{t},\hat{f})$;

step 5: clustering the updated SSPs to obtain the amplitudes of the complex-valued mode shapes the amplitudes of the time-frequency coefficients at $(\hat{t},\hat{f})$ are grouped by the Hierarchical clustering method; the clustering centers are the amplitudes of each complex-valued mode shape which are denoted as $|\Phi| = [|\varphi_1|, |\varphi_2|, \ldots, |\varphi_n|]$; $\Phi$ is the modal matrix and $\varphi_i$, $i = 1, \ldots, n$ is the mode shape vector; n is the number of modes; each group of SSPs after clustering are denoted as $(\hat{t}_1, \hat{f}_1), \ldots, (\hat{t}_n, \hat{f}_n)$;

step 6: averaging the phases of each grouped SSPs the phase differences for each grouped SSPs are obtained as $\theta(\hat{t}_1, \hat{f}_1), \ldots, \theta(\hat{t}_n, \hat{f}_n)$; the mean values of phase differences for each grouped SSPs are calculated and denoted as $\bar{\theta}(\hat{t}_1, \hat{f}_1), \ldots, \bar{\theta}(\hat{t}_n, \hat{f}_n)$;

step 7: assembling the complex-valued mode shapes using the estimated amplitudes and phases of the mode shapes each row of the modal matrix is normalized by dividing the first row to obtain the normalized matrix $|\bar{\Phi}| = [|\bar{\varphi}_1|, |\bar{\varphi}_2|, \ldots, |\bar{\varphi}_n|]$; finally, the complex-valued modal matrix is estimated as $\Phi = [|\bar{\varphi}_1|e^{j\bar{\theta}(\hat{t}_1,\hat{f}_1)}, |\bar{\varphi}_2|e^{j\bar{\theta}(\hat{t}_2,\hat{f}_2)}, \ldots, |\bar{\varphi}_n|e^{j\bar{\theta}(\hat{t}_n,\hat{f}_n)}]$.

* * * * *